(12) United States Patent
Kinjo et al.

(10) Patent No.: US 6,219,129 B1
(45) Date of Patent: Apr. 17, 2001

(54) PRINT SYSTEM (75) Inventors: Naoto Kinjo; Jun Enomoto, both of Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/274,776

(22) Filed: Mar. 24, 1999

Related U.S. Application Data (63) Continuation-in-part of application No. 09/150,746, filed on Sep. 10, 1998.

(30) Foreign Application Priority Data

| Sep. 11, 1997 | (JP) | 9-247188 |
| Mar. 24, 1998 | (JP) | 10-075432 |
| Sep. 11, 1998 | (JP) | 10-258000 |

(51) Int. Cl.$^7$ .............. G03B 27/52; G03B 17/24
(52) U.S. Cl. ............................. 355/40; 396/310
(58) Field of Search ............... 355/40, 77, 55, 355/56; 396/310, 311, 313–321; 399/45

(56) References Cited

U.S. PATENT DOCUMENTS

| 4,862,200 | * | 8/1989 | Hicks | 354/75 |
| 5,319,401 | * | 6/1994 | Hicks | 354/76 |
| 5,574,533 | * | 11/1996 | Itoh | 396/639 |
| 5,671,452 | * | 9/1997 | Seikai et al. | 396/318 |
| 5,701,530 | * | 12/1997 | Fujino | 396/311 |
| 5,710,951 | * | 1/1998 | Wakabayashi et al. | 396/311 |
| 5,726,737 | * | 3/1998 | Fredlund et al. | 355/40 |
| 5,729,328 | * | 3/1998 | Kimura et al. | 355/40 |
| 5,745,220 | * | 4/1998 | Okazaki et al. | 355/54 |
| 5,995,201 | * | 11/1999 | Sakaguchi | 355/55 |

FOREIGN PATENT DOCUMENTS

| 845897-A2 | 11/1997 | (EP) . |
| 845897-A3 | 11/1997 | (EP) . |

* cited by examiner

*Primary Examiner*—Eddie C. Lee
*Assistant Examiner*—Rodney Fuller (57) ABSTRACT

A print system comprising an acquisition device for acquiring identifying information, a memory in which the identifying information acquired by the acquisition device and information about image processing performed to produce a print reproducing image in each of a plurality of frames recorded on film are stored in corresponding relationship with one other, and a condition setting device which sets image processing conditions based on a recorded image when producing an original print, and which retrieves, from the memory, information about image processing which corresponds to the identifying information when producing a re-print of the recorded image, setting image processing conditions for the re-print which are identical to those used for the original print. This print system provides re-prints which feature consistent reproduction of an image having the same color and density as the image produced in the original (or previous) printing, providing re-prints which fully meet a customer's request and which can be output in a satisfactory manner.

24 Claims, 3 Drawing Sheets

PRINT SYSTEM

This application is a continuation-in-part of application Ser. No. 09/150,746 filed on Sep. 10, 1998, the entire contents of which are hereby incorporated by reference.

BACKGROUND OF THE INVENTION

The present invention relates to the technical field of print systems that output prints (photographs) reproducing the images recorded on films.

Most of the images recorded on photographic films such as negatives and reversals (which are hereinafter referred to as "films") are conventionally printed onto light-sensitive materials (photographic papers) by a technique generally called "direct exposure" (analog exposure) in which the image on a film is projected onto the light-sensitive material for areal exposure.

A printer that adopts digital exposure has recently been commercialized. In this "digital photoprinter", the image recorded on a film is read photoelectrically and converted into digital signals, which are subjected to various kinds of image processing to produce recording image data; a light-sensitive material is exposed by scanning with recording light modulated in accordance with the image data, thereby recording a (latent) image which is then processed photographically to produce a print.

In digital photoprinters, the image is converted to digital image data and exposing conditions can be determined by processing that image data. Hence, by using such digital photoprinters, the correction of dropouts or blocked-ups due to photography with rear light or an electronic flash, the correction of color or density failures, the correction of under- or over-exposure, the correction for the insufficiency of marginal light, sharpening and various other kinds of image processing that have heretofore been impossible or difficult to accomplish by the direct exposure technique can be performed with high degrees of freedom to produce prints of much better quality. In addition, a plurality of images can be composited into a single image or one image can be split into segments or even characters can be composited by the processing of image data. If desired, prints can be outputted after desired editing/processing in accordance with a specific application.

The capability of digital photoprinters is by no means limited to outputting the image as a print (photograph), since they enable the image data to be supplied to computers or stored in recording media such as floppy disks. Thus, with digital photoprinters, the image data can be used in various applications other than photography.

The digital photoprinter is composed of the following three basic parts: a scanner (image reading apparatus) that reads the image on a film photoelectrically with an image sensor such as a CCD sensor; an image processing apparatus in which the image data read with the scanner is subjected to various kinds of image processing (processing of image data) for determining the output image data, namely, the conditions for exposing a light-sensitive material that is to be outputted as a print; and a printer (image recording apparatus) that exposes a light-sensitive material with recording light such as optical beams modulated with the image data determined with the image processing apparatus and that performs development and other specified processes on the exposed light-sensitive material to produce it as a (finished) print.

When producing prints from films, requests are often made to perform "extra printing", or printing the image in the same frame more than once. In this case, the previous print (which is usually the print outputted in simultaneous printing) and the print (re-print) outputted in extra printing are required to reproduce images having identical colors and densities. In practice, however, due to differences between print systems or between operators in terms of evaluation and procedures, the re-print often has a different image color and density than the previous print. This has been the cause of major complaints by customers.

SUMMARY OF THE INVENTION

The present invention has been accomplished under these circumstances and provides a print system that outputs prints reproducing the images recorded either on photographic films or with image data supply sources such as digital cameras and which, when outputting re-prints as in response to a request for extra printing, is capable of consistent reproduction of an image having the same color and density as the image on the previous print.

This can be attained by a print system that performs image processing on an image recorded on a film and which outputs a print reproducing said image in a visible state, comprising:

acquisition means for acquiring identifying information that identifies each of frames of the film on which said image is recorded;

memory means in which the identifying information acquired by said acquisition means and image processing information about the image processing that was performed to produce the print reproducing the image in each of the frames that was recorded on the film are stored in correspondence with each other; and condition setting means which, when producing a print, sets image processing conditions in accordance with the image recorded on the film and which, when producing a re-print of said print, retrieves from said memory means and in accordance with the identifying information acquired by said acquisition means, the image processing information that corresponds to said identifying information, and which sets image processing conditions in accordance with the retrieved image processing information;

wherein, when producing the re-print, the image processing is reproduced on the basis of said image processing information and the reproduced image processing is performed.

Preferably, said image processing information is at least one member of the group consisting of kinds of image processing jobs performed commonly over an entire lots, kinds of image processing jobs performed to each frame, order of the image processing jobs performed, image processing conditions and data related with the image processing, and wherein said image processing conditions is at least one member of the group consisting of parameters used for each image processing job, applicable ranges of the image processing jobs, reference sites for the related data and control parameters related with hardware control in the print system.

In another preferred embodiment, the print system is either a digital print system that performs photoelectric reading of the image recorded on the film, performs image processing on a resulting input image data to produce an output image data, exposes a light-sensitive material to recording light modulated in accordance with the output image data, and produces a print, or an analog print system that performs photoelectric reading of the image recorded on the film, performs optical image processing on projected light through said film in accordance with the resulting input image data, exposes a light-sensitive material to the projected light and produces a print, wherein said memory means further stores at least one member of the group consisting of quantity of an image feature for input image data produced in previous printing, the input image data in the previous printing, reduced image data for the input image data produced in the previous printing, resolution conversion image data for the input image data produced in the previous printing, compressed image data for the input image data produced in the previous printing, quantity of an image feature for output image data produced in the previous printing, the output image data produced in the previous printing, reduced image data for the output image data produced in the previous printing, resolution conversion image data for the output image data produced in the previous printing, compressed image data for the output image data produced in the previous printing, quantity of an image feature for the output print produced in the previous printing, image data for the output print produced in the previous printing, reduced image data for the image data of the output print produced in the previous printing, resolution conversion image data for the image data of the output print produced in the previous printing and compressed image data for the image data of the output image print produced in the previous printing, and wherein said condition setting means retrieves from said memory means at least one of the quantity of the image feature and the image data in addition to said image processing information and sets the image processing conditions for re-printing in such a way that at least one member of a difference between the quantity of the image feature produced in the previous printing and the quantity of the image feature produced in the re-printing, a difference between the image data in the previous printing and the image data in the re-printing, and both differences thereof is decreased.

In yet another preferred embodiment, said identifying information comprises film information that identifies the film itself and information about frame number, and wherein said acquisition means acquires the identifying information from at least one element of the group consisting of a record in a recording medium formed on the film, a description on the film, a label attached to the film, a description on a container of the film, a label attached to the container of the film, an optical record on the film, a bar code recorded on the film, a DX code, an extended DX code, information for the date when the first print was made, customer's information in the possession of a photofinisher, and data on number of lots so far processed by a photofinisher.

Preferably, the print system further includes means for constructing film information that identifies the film itself and means by which the film information constructed by said constructing means is imparted to at least one member of the film and/or a container of the film.

Further preferably, said memory means is at least one member of the group consisting of a recording medium possessed by the film, a recording medium located within the print system, a recording medium located outside the print system, recording media located within and outside the print system, and a database in the possession of the photofinisher.

In another preferred embodiment, image data is supplied not from the film but from an image data supply source and the print is outputted that reproduces in the visible state an image carried by said image data.

In yet another preferred embodiment, the print system, wherein, in previous printing, digital image data is outputted in place of or in addition to the print, in re-printing, the digital image data as well as the information that identifies said digital image data and the image processing information are received, and a print reproducing said digital image data is constructed.

The invention further provides a print system that performs image processing on image data of an image optically recorded and which outputs a print reproducing said image in a visible state, comprising:

acquisition means for acquiring identifying information that identifies the image of said print;

memory means in which the identifying information acquired by said acquisition means and the image data of the image of the outputted print are stored in correspondence with each other; and image processing means which, when producing the print, sets image processing conditions in accordance with said image, performs image processing on the image data based on the image processing conditions and outputs the thus processed image data, and which, when producing a re-print of said print, retrieves from said memory means and in accordance with the identifying information acquired by said acquisition means, the image data that corresponds to said identifying information, performs necessary processing on the retrieved image data and outputs the thus processed image data. Optionally, the image data may be of a reduced one.

Preferably, said memory means stores said processed image data, unprocessed image data, or the unprocessed image data and information about image processing applied to said unprocessed image data.

Further preferably, when said memory means stores the unprocessed image data and the information about image processing applied to said unprocessed image data, said image processing means reproduces, when producing the re-print, image processing set in previous printing employing said information about image processing.

In a further preferred embodiment, when the print is produced, said identifying information is recorded on at least one of the print and an index print outputted together with the print.

The invention still further provides a print system that performs image processing on an image recorded on a film or on image data supplied from an image data supply source and which outputs a print reproducing said image recorded on the film or carried by the image data in a visible state, comprising:

acquisition means for acquiring identifying information that identifies each frame corresponding to said image;

memory means in which the identifying information received by said acquisition means and image processing information about the image processing that was performed to produce the print reproducing the image in each frame are stored in correspondence with each other; and condition setting means which, when at least one of producing a print and outputting digital image data for producing the print, sets image processing conditions in accordance with the image or the image data and which, when producing a re-print of said print, retrieves from said memory means and in accordance with the identifying information acquired by said acquisition means, the image processing information that corresponds to said identifying information, and which sets image processing conditions in accordance with the retrieved image processing information;

wherein, when producing the re-print, the image processing is reproduced on the basis of said image processing information and the reproduced image processing is performed.

Preferably, when outputting said digital image data in previous printing in place of or in addition to the print, said condition setting means retrieves said digital image data as well as the information that identifies said digital image data and the image processing information in re-printing, thereafter a print reproducing said digital image data is constructed.

DETAILED DESCRIPTION OF THE INVENTION

The print system of the invention will now be described in detail with reference to the preferred embodiment shown in the accompanying drawings.

Figure 1:
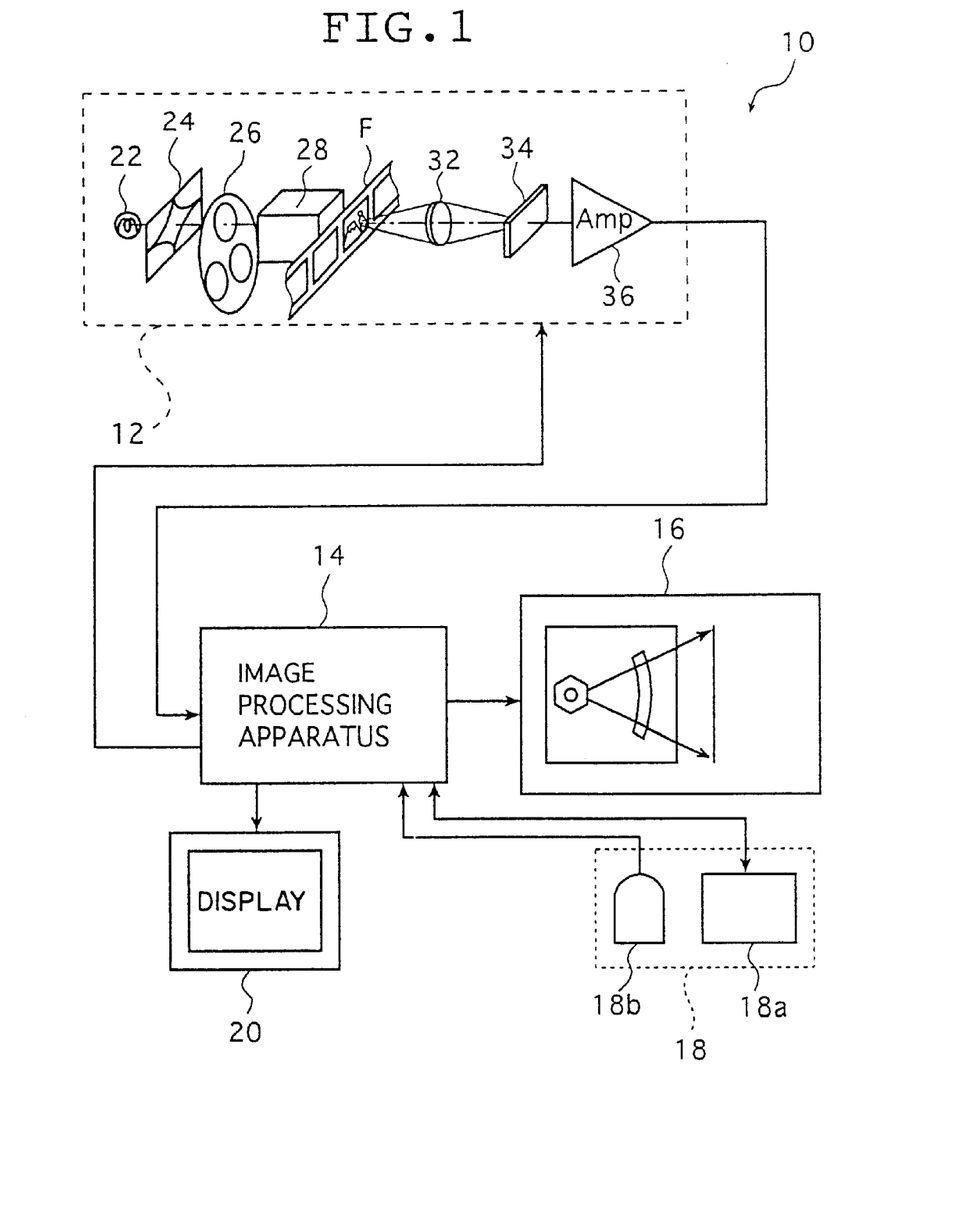
FIG. 1 is a block diagram for an exemplary digital photoprinter using the print system of the invention.

FIG. 1 is a block diagram for an exemplary digital photoprinter using the print system of the invention. The digital photoprinter generally indicated by 10 in FIG. 1 and which is hereinafter referred to simply as the "photoprinter" basically comprises: a scanner (image reading apparatus) 12 with which the image recorded on a photographic film F (hereinafter referred to as "film F") is read photoelectrically; an image processing apparatus 14 that performs image processing of the thus read image data (image information), that selects, sets and changes the image processing conditions, and that allows for manipulation, control and otherwise of the photoprinter 10. Additionally, referring to FIG. 3, there is a printer (image recording apparatus) 16 that exposes a light-sensitive material A imagewise with optical beams modulated in accordance with the image data processed in the image processing apparatus 14, develops and otherwise processes the material A and outputs it as a (finished) print P.

Connected to the image processing apparatus 14 are a manipulation unit 18 having a keyboard 18a to enter (set) various conditions, to select and issue a command for a specific processing step and to enter commands for color/density correction and a mouse 18b, as well as a display 20 that displays the image read with the scanner 12, various kinds of manipulative instructions, and screens on which various conditions are set or registered.

The scanner 12 is an apparatus for reading the image on the film F photoelectrically frame by frame. It comprises a light source 22, a variable diaphragm 24, a color filter plate or assembly 26 that has three color filters for separating the image into three primaries R (red), G (green) and B (blue) and which rotates to insert any one of the color filters into the optical path, a diffuser box 28 with which the reading light incident on the film F is made uniform on the plane of the film F, an imaging lens unit 32, a CCD sensor 34 which is an area sensor that reads the image in each frame of the film, and an amplifier 36.

The illustrated photoprinter 10 has dedicated carriers available that can be selectively mounted in the housing of the scanner 12 depending upon such factors as the type and size of films such as a cartridge for an Advanced Photo System and negatives (or reversals) of 135 size, the physical form of the film (e.g. whether it is a strip or a slide) and the kind of treatment to be applied (e.g. trimming). By changing carriers, the photoprinter 10 is capable of handling various kinds of films and treatments.

When reading the images recorded on negatives of 135 size, films in IX240 cartridges for an Advanced Photo System (APS) and so forth, the individual frames to be printed are sequentially transported by means of a carrier to specified reading positions and the images recorded in these frames are read sequence.

The carrier compatible with the cartridge of an Advanced Photo System has a magnetic head that reads the information recorded in the magnetic recording medium formed on the films for the system and which stores some other information. The information recorded in the magnetic recording medium on the film is read with the carrier and sent from the scanner 12 to any necessary site in the image processing apparatus 14 or the like; alternatively, the information from the image processing apparatus 14 or the like is sent to the scanner 12, from which is transferred to the carrier so that it is recorded on the magnetic recording medium on the film.

In the scanner 12, reading light issuing from the light source 22 is adjusted in quantity by passage through the variable diaphragm 24, then passed through the color filter plate 26 for color adjustment, and diffused in the diffuser box 28, the thus treated reading light is incident on the film F, through which it is transmitted to produce projected light that carries the image in a particular frame of the film F.

The projected light from the film F passes through the imaging lens unit 32 to be focused on the light-receiving plane of the CCD sensor 34 and read with the CCD sensor 34 photoelectrically; the resulting output signal is amplified with the amplifier 26 and thereafter sent to the image processing apparatus 14.

The CCD sensor 34 may be an area CCD sensor having for example 1380×920 pixels. In the illustrated system, the CCD sensor 34 is adapted to move around two-dimensionally (both horizontally and vertically along the pixels) by an amount equivalent to half a pixel; because of this feature, the number of pixels that can be read with the CCD sensor 34 is apparently increased by a factor of up to 4.

In the scanner 12, the above-described process of image reading is performed three times by sequentially inserting the respective color filters in the color filter assembly 26 into the optical path of the reading light, whereupon the image in one frame is separated into three primaries R, G and B.

Prior to fine scanning, or the image reading for outputting a print P, the photoprinter 10 usually performs prescanning, or reading of the image at a lower resolution, in order to determine the image processing conditions and so forth. This means the image reading is performed a total of six times for one frame.

In the illustrated photoprinter 10, the scanner 12 employing the area CCD sensors reads the image on a film such as a negative or reversal photoelectrically and the photoprinter 10 yields a print P reproducing said image. However, this is not the sole case of the invention and various other means for obtaining image data or various other sources of supplying image data into the print system of the invention may be employed, as exemplified by various kinds of image reading means, imaging means and image data storage means including a scanner that photoelectrically reads the image recorded on the film F by slit scanning employing line CCD sensors corresponding to respective R, G and B image reading, an image reading apparatus that reads the image on a reflection original, a digital camera, a digital video camera, communication means such as a LAN (local area network) and a computer conferencing network and various other recording media such as a memory card, an MO (magneto-optical recording medium) and a photo CD. Image-carrying data from these supply sources or obtaining means is received by the print system which then outputs a print P reproducing the image of interest.

As already mentioned, the output signal (image data) from the scanner 12 is delivered to the image processing apparatus 14.

Figure 2:
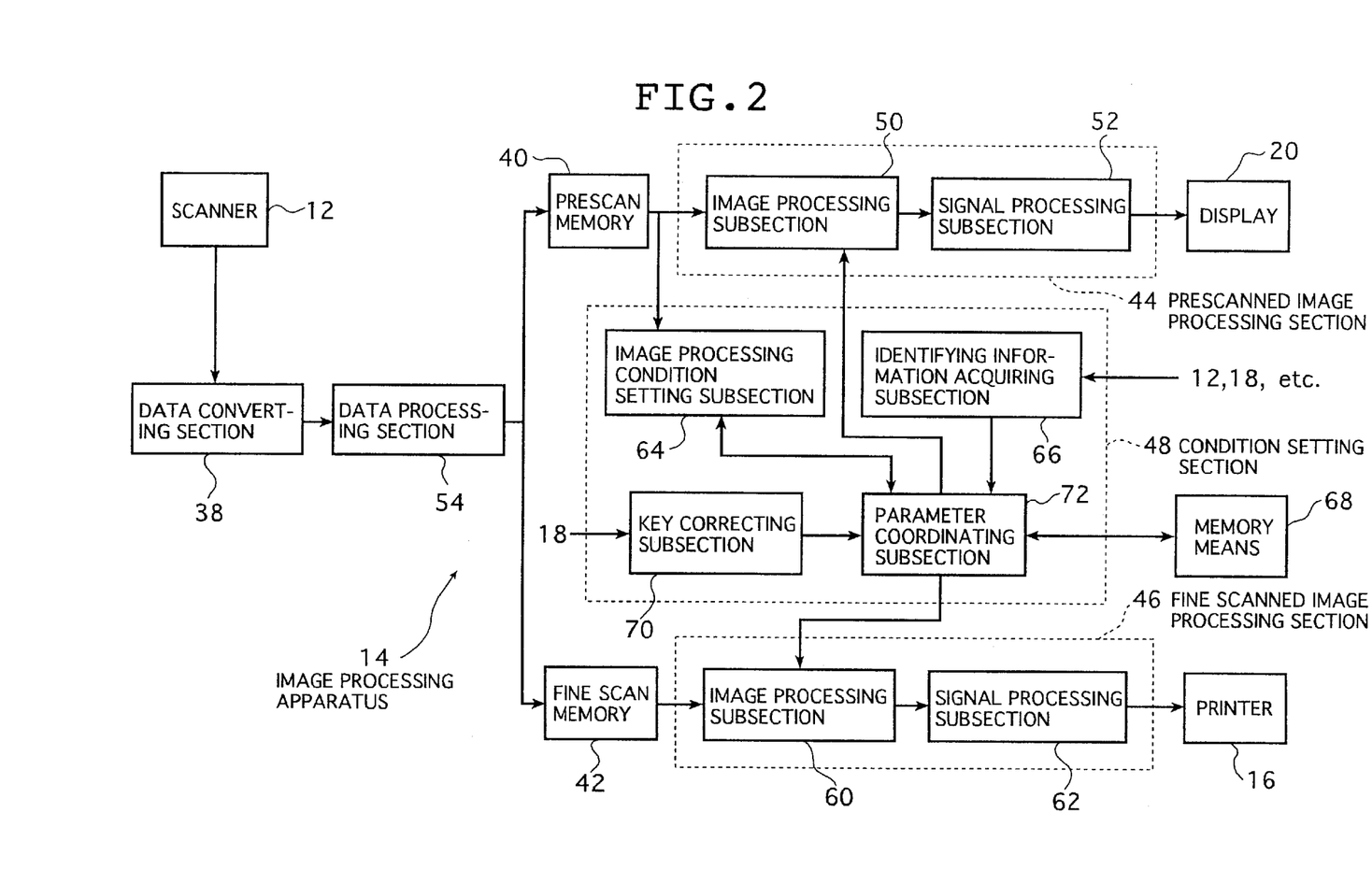
FIG. 2 is a block diagram for an example of the image processing apparatus in the digital photoprinter shown in FIG. 1.

FIG. 2 is a block diagram for the image processing apparatus 14. As shown, the image processing apparatus 14 (hereinafter referred to simply as the "processor 14") comprises a data converting section 38, a data processing section 54, a prescan (frame) memory 40, a fine scan (frame) memory 42, a prescanned image processing section 44, a fine scanned image processing section 46, and a condition setting section 48.

FIG. 2 is mainly intended to show the sites that are related to image processing. In addition to the components shown in FIG. 2, the image processor 14 includes a CPU that controls and manages the photoprinter 10 in its entirety including the image processor 14, a memory that stores the information typically necessary for the operation of the photoprinter 10, and means for determining a specific value to which the variable diaphragm 24 should be stopped down and the storage time of the CCD sensor 34. The manipulating unit 18 and the display 20 are connected to the associated sites via the CPU and related parts (i.e., CPU bus).

The respective output signals associated with R, G and B that have been delivered from the scanner 12 are first subjected to A/D (analog/digital) conversion and log conversion in the data converting section 38 to produce digital (input) image data, which is then supplied to the data processing section 54 where they are subjected to various processes including DC offset correction, darkness correction and shading correction and the thus processed input image data is stored in the prescan memory 40 if it is prescanned image data and in the fine scan memory 42 if it is fine scanned image data.

It should be noted here that the prescanned (image) data and the fine scanned (image) data are essentially the same except for the pixel density and the signal level. In the illustrated apparatus, the amount by which the variable diaphragm 24 is stopped down during fine scanning is set to an optimal value on the basis of the prescanned data by means of the processor 14 and the signal levels of the prescanned and fine scanned data are varied accordingly.

The prescanned data stored in the prescan memory 40 is processed in the prescanned image processing section 44 and the fine scanned data stored in the fine scan memory 42 is processed in the fine scanned image processing section 46.

The prescanned image processing section 44 comprises an image processing subsection 50 and a signal processing subsection 52. The fine scanned image processing section 46 also comprises an image processing subsection 60 and a signal processing subsection 62.

The image processing subsection 50 in the prescanned image processing section 44 (which is hereinafter referred to as "processing subsection 50") and the image processing subsection 60 in the fine scanned image processing section 46 (which is hereinafter referred to as "processing subsection 60") are both a site at which the image (image data) read with the scanner 12 is subjected to specified kinds of image processing in accordance with the image processing conditions set by means of the condition setting section 48 that will be described below in detail. Except for the pixel density of the image data to be processed, the two processing subsections perform essentially the same processing.

The image processing to be performed by the processing subsections 50 and 60 may be exemplified by basic processes including gray balance adjustment (color balance adjustment), contrast correction (toning) and lightness correction, as well as at least one process that is performed depending upon the state of an image (the image data read with the scanner 12), at a customer's request, in response to an operator's instruction or the like and which may be exemplified by the correction of a geometrical distortion, the correction of a density unevenness (the correction of marginal light), sharpening, dodging, finishing for special effects (e.g., cross filtering, soft focusing, rendering in black and white, and rendering in sepia), enhancement/blurring, processing of the face region (in such aspects as density, color/texture of the skin, and enhancement/blurring), correction of red eye, processing and modification of the shape and color of parts of the face such as eyes, hair on the head and lips), correction of flaws on the film, changing proportions in a horizontal and a vertical direction as in causing a person in portraiture to look slender (variable magnification), compositing images (different images and animation characters) and letters, and electronic variable magnification as in trimming.

These corrections may be performed by any known methods that comprise appropriate combinations of arithmetic operations for image processing, processing with LUTs (look up tables), matrix operations and processing with filters. For instance, gray balance adjustment, lightness correction and contrast correction are each performed using correction (adjustment) tables constructed in accordance with the quantities of image features such as highlight (minimal density), shadow (maximal density) and average density. Such correction tables are usually constructed for three primaries R, G and B. Referring to LUTs for gray balance and tone adjustments, they may be constructed by on the basis of image data accumulated for one roll of film F.

Sharpening may be performed by a method in which the original image is averaged to provide a first averaged image, which in turn is averaged, and the difference between the two images is multiplied by a coefficient of sharpness correction and the resulting image is added with the first averaged image.

For dodging, a blurred image (data) is generated using luminance signals converted from image data or by filtering with IIR filters or the like and the blurred image is used to construct LUTs or arithmetic formulae; image data processed with the constructed LUTs or arithmetic formulae are used to compress or expand both high- and low-density regions, whereby the midtone is retained but the dynamic range of the original image is compressed or expanded to impart a dodging effect (see, for example, the description in Unexamined Published Japanese Patent Application (Kokai) Nos. 18704/1997 and 182093/1997, and the specification of Japanese Patent Application No. 207941/1997).

The corrections of geometric distortions and marginal light are chiefly intended to compensate for the distortion and reduced light quantity that occur in the marginal area of an image taken with an inexpensive camera such as a roll of film fitted with a lens. The offset in pixel position due to the distortion and the reduction in the quantity of light can be expressed by functional formulae; hence, in order to correct geometrical distortions and marginal light, suitable functional formulae may be constructed and using them, the positions of individual pixels are corrected to become appropriate and a density adjustment is made to compensate for the decrease in marginal light. Such functional formulae are usually constructed for each of the three primaries R, G and B.

An exemplary method of correcting flaws on the film comprises designating the unwanted region including the flaws by verification with a monitor and replacing the image data for the unwanted region by image data for the surrounding background (see the specification of Japanese Patent Application No. 69366/1997).

The signal processing subsection 52 of the prescanned image processing section 0 is a site at which the image data processed by the processing subsection 50 is transformed with LUTs or like means to produce image data corresponding to the display on the display 20.

The signal processing subsection 62 of the fine scanned image processing section 46 is a site at which the (output) image data processed by the processing subsection 60 is transformed to image data corresponding to image recording by the printer 16, to which it is then supplied. As will be described later in detail, the printer 16 forms a latent image by scan exposing a light-sensitive material (photographic paper) with optical beams modulated with the supplied image data, performs specified development and subsequent processes on the latent image and outputs the thus processed light-sensitive material as a print. Note that processing conditions such as image data conversion tables and the like set in the signal processing subsection 62 may also be stored as image processing conditions.

The kinds of image processing to be performed by the processing subsection 50 of the prescanned image processing section 44 and by the processing subsection 60 of the fine scanned image processing section 46, as well as the conditions for such image processing are set by the condition setting section 48.

The condition setting section 48 comprises an image processing condition setting subsection 64, an identifying information acquiring subsection 66, a key correcting subsection 70 and a parameter coordinating subsection 72. Connected to the parameter coordinating subsection 72 is a memory means 68 by which information that identifies individual frames of the film F from which a print was previously prepared (usually when simultaneous printing was done) and the information for processing the image in that frame are stored in correspondence with each other.

The image processing condition setting subsection 64 (which is hereunder referred to simply as "setting subsection 64") sets the conditions for the image processing that should be performed to produce display and output images in the processing subsections 50 and 60 in accordance with the prescanned image and optionally in accordance with the principal part (or its region) extracted from the prescanned image and in response to an operator's instruction and, in the case of re-printing, further using the information about image processing that is stored in the memory means 68, and the thus set image processing conditions are supplied to the parameter coordinating subsection 72.

Specifically, the setting subsection 64, based on the prescanned data, constructs density histograms, calculates the quantities of image features such as average density, highlight (minimum density), shadow (maximum density), LATD (large-area transmission density) and maximal and minimal densities in the histograms and optionally extracts the principal part of an image (or its region) such as the face of a person; in accordance with the thus obtained quantities of image features and the principal part of the image, as well as with the operator's instruction, the information about image processing and so forth, the setting subsection 64 determines which of the various kinds of image processing described above should be executed and in what order; the setting subsection 64 also determines the conditions for the image processing to be done and supplies the thus determined parameters to the parameter coordinating subsection 72.

The method of extracting the principal part of an image is not limited in any particular way. An exemplary method is by the operator designating a point in the principal part with an input device such as the mouse 18b and extracting the principal part on the basis of the continuity of the image (in such terms as color and shape). In another method, the principal part of the image on the display screen may be selected using the mouse 18b or some other input device.

Known algorithms for extracting the principal part of an image may also be employed, as described in Unexamined Published Japanese Patent Application (kokai) No. 138470/1997, according to which different methods of extraction as by extracting a specified color, extracting a specified geometrical pattern and eliminating a region estimated to represent the background, are evaluated preliminarily to determine the weights for the respective methods, the principal part of an image is extracted by each method and weighted by the predetermined weights and the principal part is identified and extracted accordingly. Other methods that can advantageously be used in the present invention to extract the principal part of an image are described in Unexamined Published Japanese Patent Application (Kokai) Nos. 346333/1992, 158164/1993, 165120/1993, 160993/1994, 184925/1996, 101579/1997, 138471/1997, etc.

Key correcting subsection 70 is such that the amounts of adjustment of the image processing conditions are calculated in response to commands that are entered from the keyboard 18a or the mouse 18b in the manipulating unit 18 for adjusting color, density, contrast (gradation) and other parameters, and the calculated values are supplied to the parameter coordinating subsection 72.

If an input for color adjustment is entered from the manipulating unit 18, the corresponding amount of correction is calculated in the key correcting subsection 70 and, in accordance with the calculated amount of correction, the parameter coordinating subsection 72 corrects the table for gray balance adjustment. If an input for density adjustment is entered, the table for lightness correction is similarly adjusted. If an input for contrast adjustment is entered, the table for contrast correction is likewise adjusted.

The parameter coordinating subsection 72 receives the image processing conditions set by the setting subsection 64, sets the supplied image processing conditions both in the processing subsection 50 of the prescanned image processing section 44 and in the processing subsection 60 of the fine scanned image processing section 46, and adjusts the thus set image processing conditions in accordance with the amounts of adjustments and the like calculated in the key correcting subsection 70.

In the case of simultaneous printing (or when no command for re-printing is issued), the parameter coordinating subsection 72 supplies the memory means 68 with both the information identifying each frame as acquired by the identifying information acquiring subsection 66 and the information about image processing of the specific frame. In the case of re-printing, the parameter coordinating subsection 72 reads the information about image processing of the frame from the memory means 68 in accordance with the identifying information that has been acquired by the identifying information acquiring subsection 66.

The identifying information acquiring subsection 66 is a site where, when preparing a print, the information that identifies the frame to be printed is acquired and from which it is sent to the parameter coordinating subsection 72.

In order to identify individual frames in the film F, both means of identifying the film F itself and the information about the number assigned to each of the frames in the film are required and the identifying information may be composed of the information identifying the film F itself (e.g., identification number, ID or code) and the frame number. The identifying information may be individual to a specific frame, that is, a print (or image) to be specifically outputted, without having any connection with the film.

In both cases of the previous printing and re-printing, the identifying information acquiring subsection 66 acquires the identifying information by any suitable method that is determined by various factors such as the type of the film used and the management system adopted by a specific photofinisher.

Consider, for example, the case where the film F is a film (cartridge) for use in the Advanced Photo System. Since the ID number of the cartridge and the number assigned to each frame are recorded as magnetic information in the magnetic recording medium on the film, the identifying information acquiring subsection 66 receives magnetic information that has been read with and transferred from the scanner 12 (specifically the carrier mounted in it) and acquires the information identifying the frame to be printed, with the ID number of the cartridge being substituted for the film identification number.

Usually, the ID number of the cartridge is not only recorded in the magnetic recording medium but also indicated on the cartridge, so the operator may utilize this information to enter from the keyboard 18a or the like the ID number of the cartridge of the film of which the re-printing has been asked for and the number of the frame to be printed.

In other cases than the Advanced Photo System, the following method may be employed for the identifying information acquiring subsection 66 to acquire the identifying information: in a specific instance such as simultaneous printing (the development of film F and the preparation of a print are done simultaneously), the information identifying the film F is determined in accordance with the date of print, the name of the customer, a developing apparatus employed for film development, various kinds of information included in a DX code and an extended DX code and other information and recorded on the film F (outside the image area) or on the bag or casing of the film F; then in the process of simultaneous printing or re-printing, the operator enters the film identifying information from the keyboard 18a or other input device.

Instead of recording the identifying information directly on the film F or its bag or casing, a label bearing that information may be attached to the film F or its bag or casing. Alternatively, a bar code indicating the film identifying information may be attached to the film F or its bag or casing so that the identifying information is read with a bar code reader.

If desired, the film identifying information or the bar code indicating that information may be optically recorded on a yet to be developed film F and rendered visible by subsequent development. In this case, if the film F is cut into pieces of the negative film, each having, for example, 4 to 6 frames, it is preferable to record identifying information on each piece of the negative film.

The methods described above are also applicable to the Advanced Photo System. If desired, the determined identifying information may be recorded magnetically and substituted for the cartridge ID.

If desired, the identifying information may be recorded on the reverse surface of the print, along with a back print generally recorded on the reverse surface of the print, or inside or outside of an image area on the print. Otherwise, identifying information corresponding to respective frames may be recorded in an index print outputted together with the prints of the respective frames. As in the aforementioned case, identifying information may also be converted into a bar code. In case of the Advanced Photo System, the cartridge ID and the frame number that are recorded in the index print may be utilized as the identifying information.

Also in these cases, the operator may enter identifying information of the film F using the keyboard 18a, a bar code reader or other input device during the process of simultaneous printing or re-printing so that the identifying information acquiring subsection 66 may acquire the identifying information.

The image processor 14 may be so adapted that the film identifying information (or the bar code indicating it) is automatically determined and imparted to the film F or its bag or casing. For example, at the time the film F has been loaded in the scanner 12 (or the carrier), the film identifying information is determined automatically with the processor 14 and sent to the identifying information acquiring subsection 66; the processor 14 is also furnished with means of preparing and attaching a label bearing the identifying information so that the label is attached to the film F for which the reading process (print production) has ended.

Alternatively, when developing the film F, the identifying information is determined automatically with the control section of the film processor and printed optically on the film F in a non-image area (e.g. the virgin area at the advancing or trailing end); in another method, the processor 14 is furnished with means of preparing and attaching a label bearing the identifying information so that it is attached to the developed film.

If the identifying information is imparted to the film F or its bag or casing in such a way that it can be read optically or by other means, the scanner 12 (or the carrier) or the like may perform automatic optical reading during simultaneous printing or re-printing so that the identifying information is automatically acquired by the identifying information acquiring subsection 66. Such reading operation may utilize a reading means that is generally disposed in the carrier for reading a bar code such as a DX code or the like.

If a photofinisher (or processing station) has a record on a customer's ID, the date on which a request for simultaneous printing was made, the number of films so far processed and other information, the film F itself can be specified by combinations of these items of information. Therefore, a suitable combination of such items may be substituted for the information identifying the film F.

It should also be noted that a (digital) photoprinter allows print's image data to be saved as a file in a recording medium such as a floppy disk. Hence, the name of the saved image file may be used as the film identifying information.

In whichever case, the frame number has been recorded in each frame in the process of film manufacture and, hence, may be used as such. Alternatively, a bar code, a DX code, an extended DX code or the like that is optically recorded on the film F may substitutes for the frame number. The identifying information acquiring subsection 66 may acquire the frame number by counting with the scanner 12 (or the carrier), reading of the bar code recorded on the film F or inputting with the operator.

The memory means 68 is such that the information identifying each of the frames of the film F and the information about image processing of the frame are stored in correspondence with each other.

The information about image processing to be stored is the information about image processing for duplicating the same image processing as has been done in the previous printing and may comprise the kinds of image processing that were applied, their order, the image processing conditions or parameters and associated data for duplicating such conditions.

The image processing conditions or parameters and associated data for duplicating them depend on the kinds of image processing to be applied and comprise various kinds of information that can duplicate the previous image processing (conditions), as specifically exemplified by LUTs and processing arithmetic formulae that were constructed for image processing, coefficients in predetermined image processing arithmetic formulae, information about the regions that were subjected to image processing, and data files for composited images or letters.

Speaking first of gray balance adjustment, lightness correction and contrast correction, appropriate LUTs are constructed and used to perform the intended correction and adjustment as already described above; therefore, the necessary LUTs (for the respective primaries R, G and B) are stored. As also mentioned above, LUTs for gray balance adjustment and tone correction may be constructed from image data equivalent to one roll of film F; in this case, the LUTs may be stored as information shared by all frames of the film F to be processed.

For sharpening, the already-mentioned coefficient for sharpness correction is stored.

In dodging, LUTs or processing arithmetic operations are set for processing the image data and the resulting image data is used to compress or expand the dynamic range of densities; therefore, the necessary LUTs or processing arithmetic operations are stored.

The corrections of geometrical distortions and marginal light are performed on the basis of functional formulae that express offsets in pixel positions and reduced light quantities. Hence, such functional formulae are stored. If the functional formulae are constructed for the three primaries R, G and B, they should all be stored. The functional formulae are the same for all frames in one roll of film F and, hence, may be stored as information about the film F. Alternatively, correcting (two-dimensional) tables that represent offsets in pixel positions and reduced light quantities may be constructed and stored.

When the previous image processing was the correction of flaws on the film, the position of a designated flaw and the pixel data (or a portion thereof) for the background substituted for the flaw are stored.

If the previous image processing is the compositing of animation characters and other images or letters, the name of the file of the composited letters or images and the position of their compositing are stored. If the previous image processing is the processing of the face region or a partial modification thereof, the modified region as well as data on color/density and shape correction are stored. If the previous image processing is the changing of proportions in a horizontal and a vertical direction, the variable magnification in the two directions is stored. If the previous image processing is trimming, the variable magnification is stored. If the previous image processing is finishing for special effects, the parameters associated with the respective processes are stored.

As already mentioned, the processor 14 may optionally extract the region of the principal part of an image such as the face region for setting the image processing conditions; therefore, if the previous image processing is limited to the correction of the face region, the information about the face region is also stored.

The memory means 68 of storing the film identifying information and the information about the necessary image processing is not limited to any particular type and various kinds of memory means may be employed.

For example, if the film F is to be used in an Advanced Photo System, the magnetic recording medium formed on the film F may be used as the memory means 68. It should however be noted that due to the limited memory capacity of the magnetic recording medium formed on the film F, it is not suitable for use in storing bulk information.

If desired, a recording medium such as a floppy disk, a magneto-optical recording medium or an IC card may be used as the memory means 68. In this case, the recording medium is handed over to a customer together with a finished print and when re-printing is to be done, the customer returns the recording medium together with a film F and the relevant information is read with a drive or the like that are connected to the photoprinter 10.

If a photofinisher (processing shop) has a data base available for its customers, the data base may be used as the memory means 68. If the film identifying information and the information about the necessary image processing are saved permanently, their amount becomes unbearably bulky. To avoid this problem, the storage time is preferably set for a definite period determined appropriately. For example, most requests for re-printing are made within a month from the simultaneous printing and, hence, the storage time need not be longer than about a month from the simultaneous printing.

Alternatively, the processor 14 or a personal computer in the possession of a photofinisher may be connected to communication means such as a computer conferencing network like a LAN or WAN (wide area network) and at the request for re-printing of the film F, the database of the photofinisher who made the previous printing job is accessed to get the necessary information for image processing. According to another approach, the personal computer in the possession of a customer is used as the memory means 68, in which the film identifying information and the information about the necessary image processing are stored at such a time that simultaneous printing is done and later accessed at the time of re-printing to get the necessary information about image processing.

Referring again to the compositing of animation characters and other images as well as letters, if the data on the composited images or letters (which are hereinafter referred to as "reference data") belong to the customer who made the request for re-printing, the reference data itself may be recorded in the recording medium to be handed over to the customer or on the personal computer in his or her possession.

If the volume of information in the reference data is larger than a specified value, the reference data may itself be saved in the database of the photofinisher for a specified period whereas the name of its file and the information to be accessed are recorded in the recording medium to be handed over to the customer.

If the reference data is for general purposes as in the case where it represents a specified pattern or has been quoted from a certain database, the name of its file and the information to be accessed may be recorded in the recording medium to be handed over to the customer If the print's image data is to be saved as a file in a recording medium such as a floppy disk, the film identifying information and the information about the necessary image processing may be added as accessory data to the image file.

Figure 3:
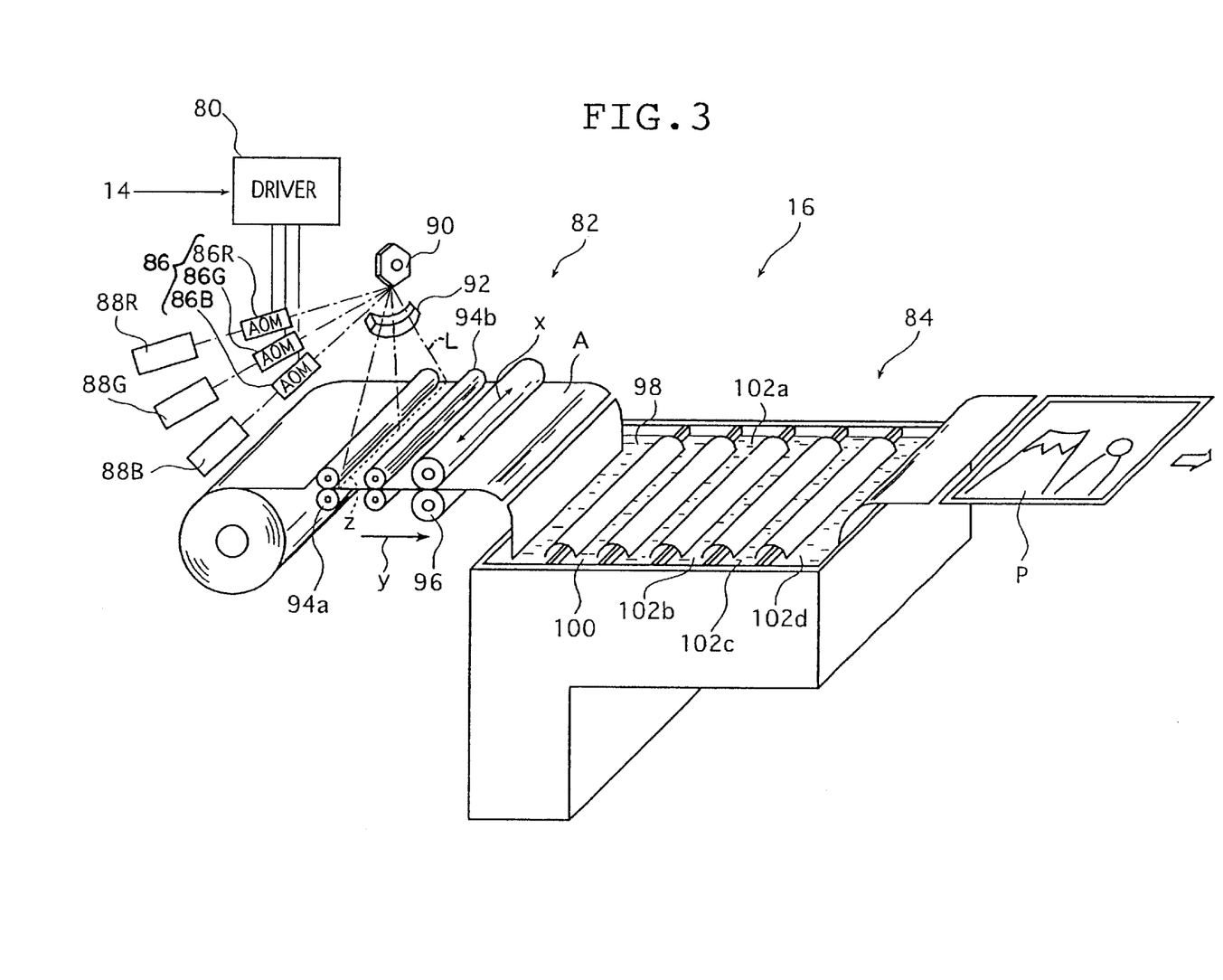
FIG. 3 shows diagrammatically the printer section of the digital photoprinter shown in FIG. 1.

As already mentioned, the image data processed in the processor 14 is subsequently sent to the printer 16 which is shown diagrammatically in FIG. 3. As shown, the printer 16 basically comprises a driver 80, an exposing section 82 and a developing section 84. Optical beams L are modulated, typically pulse-width modulated, in accordance with the image data sent from the processor 14 and a light-sensitive material A is exposed with the modulated optical beams L.

The image data from the processor 14 is sent to the driver 80. In the driver 80, the image data sent from the processor 14 (particularly, the signal processing subsection 62) is converted to signals that drive AOMs 86 such that they perform pulse-width modulation of the optical beams L in accordance with the image to be recorded (the amount of exposure).

In the exposing section 82, the light-sensitive material A is exposed by scanning with the modulated optical beams L such that the image associated with the aforementioned image data is recorded on the light-sensitive material A. As shown in conceptual form in FIG. 3, the exposing section 82 comprises a light source 88R that issues an optical beam in a narrow wavelength range capable of exposing the R-sensitive layer in the light-sensitive material A, a light source 88G similarly capable of exposing the G-sensitive layer, a light source 88B similarly capable of exposing the B-sensitive layer, AOMs 86R, 86G and 86B that modulate the optical beams from the respective light sources in accordance with the image to be recorded, a polygonal mirror 90 as an optical deflector, an fθ lens 92, and means of transporting the light-sensitive material A in an auxiliary scanning direction.

The respective optical beams from the light sources 88R, 88G and 88B travel at different angles to be launched into the corresponding AOMs 86 (86R, 86G and 86B). These AOMs 86 have been supplied from the driver 80 with drive signals R, G and B in accordance with the image to be recorded, or the image data supplied from the processor 14 and being driven with these signals, the AOMs 86 modulate the incident optical beams in accordance with the image to be recorded.

The respective optical beams modulated with the AOMs 86 are incident at substantially the same point on the polygonal mirror 90, from which they are reflected for deflection in the main scanning direction (indicated by arrow x in FIG. 3) and adjusted by the fθ lens 92 such that they are imaged to give a specified beam shape in a specified scan position z to be incident on the light-sensitive material A. The exposing section 82 may be furnished with optical beam shaping means and tilt correcting optics as required.

A web of the light-sensitive material A is rolled on itself and contained in magazines which are loaded in specified positions.

The light-sensitive material A is unreeled with withdrawing rollers and cut with cutter to a specified length corresponding to one print. By means of a pair of transport rollers 94a and 94b that are provided on opposite sides of the scan position z to constitute the means of transport in the auxiliary scanning direction (as indicated by arrow y in FIG. 3) which is perpendicular to the main scanning direction, the light-sensitive material A is transported in the auxiliary scanning direction as the scan position z is held constant relative to it. The back print consisting of necessary information is recorded on the reverse surface of the light-sensitive material in the transport path thereof. As described above, the identifying information of the specific frame, that is, its print (or image) may be recorded as the back print.

Since the optical beams are deflected in the main scanning direction, the entire surface of the light-sensitive material A being transported in the auxiliary scanning direction is exposed by two-dimensional scanning with those beams, whereby the (latent) image associated with the image data transferred from the processor 14 is recorded on the light-sensitive material A.

After the end of exposure, the light-sensitive material A is fed by means of a transport roller pair 96 into the developing section 84, where it is developed and otherwise processed to produce a finished print P.

If the light-sensitive material A is a silver salt light-sensitive material, the developing section 84 essentially comprises a color developing tank 98, a bleach-fixing tank 100, rinsing tanks 102a, 102b, 102c and 102d, a drying zone and a cutter (the latter two are not shown). After being developed and given the necessary treatments in the respective tanks, the light-sensitive material A is dried and outputted as a print P.

The print system of the invention will now be described in greater detail with reference to the action of the photoprinter 10.

Let us first describe the case of performing so-called "simultaneous printing". In the case of simultaneous printing, a carrier compatible with the film F is loaded on the scanner 12 in a specified position and the film F is set on the carrier in a specified position, whereupon the first frame of the film F, usually Frame Number 1 is transported by the carrier to a specified reading position.

If the film F to be read (subjected to print production) is one for the Advanced Photo System, the magnetic information recorded on the film F is read by the carrier as it is transported and the necessary information is transferred to the processor 14 so that the ID number of the cartridge is sent to the identifying information acquiring subsection 66 as a number that identifies the film F.

If the film F is a common negative or reversal of 135 size, the following procedure may be taken: before loading the film F on the carrier, the operator, with reference to, for example, the date, customer and other items of information, determines the number that identifies the film F itself and attaches to the non-image area of the film F a label bearing the determined identifying number and he also enters the setting of identifying number from the keyboard 18a. As a result of this entry step, the number identifying the film F to be subjected to print production is sent to the identifying information acquiring subsection 66. As already mentioned, the processor 14 may be so adapted that it can automatically determine the film identifying number, impart it to the film F, read it and transfer it to the identifying information acquiring subsection 66.

Subsequently, an image reading step is started when the scanner 12 has been verified to be in a specified status in such terms as the quantity of light from the light source 22, the setting of the opening of the variable diaphragm 24 and the start-up of the CCD sensor 34.

Stated more specifically, light is issued from the light source 22, has its quantity adjusted by the variable diaphragm 24 and the color filter assembly 26 and diffused by the diffuser box 28. The thus processed reading light is incident on the first frame in the reading position and passes through it to produce projected light carrying the image recorded in that frame. The projected light is then passed through the imaging lens unit 32 to be focused on the image-receiving plane of the CCD sensor 34, where it is converted photoelectrically; the resulting electric signals are amplified with the amplifier 36 and sent to the processor 14.

As already mentioned, the scanner 12 performs this image reading step three times by sequentially inserting the color filters R, G and B of the color filter assembly 26 into the optical path of the reading light, whereupon the image recorded on the film F is sequentially separated into three primaries R, G and B.

Further, as also mentioned above, fine scanning for producing an output image is preceded by prescanning for reading the image at a low pixel density; hence, the reading step is performed a total of six times for each frame.

When the image reading of the first frame ends, the carrier transports the film F by a distance equivalent to one frame so that the second frame is transferred to the reading position and as in the case of the reading of the first frame, both prescanning and fine scanning are performed to read the image in the second frame and the obtained image data is sent to the processor 14. Subsequently, the third frame is transferred to the reading position and the image is read by the same procedure. Similarly, the images in the fourth and ensuing frames are sequentially read and the resulting image data are sent to the processor 14.

In addition to the image data, the information about which of the frames contains the image that was read, namely, the frame number for the image (image data) that was read, is also sent to the processor 14 (particularly to the identifying information acquiring subsection 66). It should be remembered that the frame number may be identified by the number of reading counts from the first frame or by reading the bar code recorded on the film F or on the basis of magnetic information if the film F is for the Advanced Photo System.

The image data outputted from the scanner 12 is supplied to the data converting section 38 where it is subjected to A/D conversion and log conversion to produce digital image data, which in turn is sent to the data processing section 54 where it is subjected to a specified kind of data processing such as offset correction and the processed R, G and B data are sequentially transferred to and stored in the prescan memory 40 if they are prescanned data and in the fine scan memory 42 if they are fine scanned data.

When prescanned data is stored in the prescan memory 40, the setting subsection 64 reads the stored image from the memory. Then, as mentioned above, the setting subsection 64 constructs density histograms and calculates the quantities of the image features and optionally extracts the principal part of the image such as the face of a person. Based on the results of these operations, the setting subsection 64 sets the reading conditions for fine scanning such as the value to which the variable diagram 24 should be stopped down; it also selects what image processing should be executed, determines the order of execution and further sets the conditions for the respective kinds of image processing to be executed. The thus set image processing conditions are sent to the parameter coordinating subsection 72 which sets those conditions in the processing subsection 50 of the prescanned image processing section 44 and in the processing subsection 60 of the fine scanned image processing section 46.

It should be remembered that fine scanning is performed after the reading conditions have been set and fine scanned data for R, G and B are sequentially transferred to and stored in the fine scan memory 42.

When the image processing conditions are set in the processing subsection 50, the prescanned data is read from the prescan memory 40 and processed in the processing subsection 50 under the thus set image processing conditions. The processed image data is then supplied to the signal processing subsection 52, where it is converted to image data for presentation on the display 20, so that a prescanned image is displayed on the display 20.

Looking at the screen of the display 20, the operator verifies the image, or the result of the image processing, and optionally adjusts its color/density, gradation and other characteristic features, as well as compositing and partial modifications of the image using the keyboard 18a or mouse 18b.

Signals for these adjustments are sent to the key correcting subsection 70, which calculates the amounts of correction of the image processing conditions in accordance with the entered inputs and sends them to the parameter coordinating subsection 72. As already mentioned, in accordance with the thus sent amounts of correction, the parameter coordinating subsection 72 corrects the image processing conditions that have been set in the processing subsections 50 and 60. Therefore, in accordance with the operator-entered inputs, the image on the screen of the display 20 also varies.

If the operator concludes that the image on the display 20 is appropriate (i.e., the result of the verification is satisfactory), he manipulates the keyboard 18a or mouse 18b to enter a command for starting the printing operation.

As the result, the image processing conditions are finalized and the fine scanned data is read from the fine scan memory 42, processed in the processing subsection 60 of the fine scanned image processing section 46 under the finalized conditions, sent to the signal processing subsection 62, where it is converted to image data associated with the image recording by the printer 16; the converted image data is subsequently sent to the driver 80 in the printer 16.

At the same time, the parameter coordinating subsection 72 acquires the frame number and the film identifying number (which combine to produce the frame identifying information) from the identifying information acquiring subsection 66, keys the acquired frame identifying information to the information for image processing that corresponds to the finalized image processing conditions and which is specifically exemplified by what image processing should be performed in what order, the parameters and LUTs to be used in image processing, the data indicating the range of applicability of specific image processing and the information about the associated image data, sends both kinds of information to the memory means 68, and stores them in it.

It should be noted that the present invention is not limited to the case of the operator checking the result of image processing. If desired, the image processing conditions may be finalized at the point of time when the parameter coordinating subsection 72 ended the setting of those conditions in the processing subsection 60 and in the same manner as just described above, the printing step is started and both the information about image processing and the frame identifying information are transferred to the memory means 68. Preferably, modes or some other suitable selection means are provided to enable the operator to check or not check the result of image processing.

When the image data is sent to the driver 80 in the printer 16, optical beams modulated by the drive of AOMs 86 with the driver 80 and which have been deflected in the main scanning direction by means of the polygonal mirror 90 perform two-dimensional scan exposure of the light-sensitive material A that has been cut to a specified length equal to one print and which is being transported in the auxiliary scanning direction by means of transport roller pair 94, whereby a latent image is formed and the thus exposed light-sensitive material A is supplied to the developing section 16, where it is color developed, bleach-fixed, rinsed, dried and otherwise processed to be eventually outputted as a final print P. The procedure of these steps has already been described above.

In the print system of the invention, the memory means 68 is not only intended to store the information about the image processing for simultaneous printing; if a customer is dissatisfied with the image obtained by simultaneous printing and asks for re-printing with instructions for specific color/density processing or in the case of re-printing the frame for which no information about its image processing has been stored, the image processing conditions finalized in the process of simultaneous printing may be saved as the information about image processing for the previous print.

In the following description, simultaneous printing is assumed as the production of the previous print.

In contrast with simultaneous printing, the photoprinter 10 performs re-printing by the following basic procedure.

Entering a command for re-printing, the operator loads the scanner 12 with a carrier compatible with the film F the processing of which has been requested by a customer. The operator then loads the film F in the carrier and manipulates the keyboard 18*a* or the mouse 18*b* to designate the frame to be re-printed. As the result, the carrier transports the film F so that the frame to be re-printed is transported to the reading position.

If the film F is for use with the Advanced Photo System, the transporting carrier reads the magnetic information recorded in the magnetic recording medium on the film F and the necessary information is sent to the processor 14, where the identifying information acquiring subsection 66 acquires the information identifying the frame to be re-printed, namely, the number identifying the film F (the ID number of the cartridge) and the number of the frame transported to the reading position.

If the film F is a common negative or reversal of 135 size, the operator looks at the description on the film F or the label attached to it and provides input from the keyboard 18*a* or the mouse 18*b* in the manner already described above, whereupon the identifying information acquiring subsection 66 acquires the film identifying number. At the same time, the operator designates the frame to be re-printed, whereupon the identifying information acquiring subsection 66 acquires the frame number.

As also mentioned above, the number identifying the film F may be acquired by automatic reading of the identification number on the label and the frame number may be recognized by reading the bar code on the film, so that the two kinds of information can be acquired automatically with the identifying information acquiring subsection 66.

Then, as in the case of simultaneous printing, verification is made as to whether the scanner 12 is in a specified status and if the answer is yes, the reading step is started to perform prescanning and fine scanning, whereupon image data are sequentially sent to the prescan and fine scan memories and stored there.

The identifying information acquiring subsection 66 supplies the parameter coordinating subsection 72 with the information identifying the frame to be re-printed; the parameter coordinating subsection 72 reads from the memory means 68 the information about image processing keyed to the acquired identifying information and sends it to the setting subsection 64.

In the same manner as in the previous printing (i.e., simultaneous printing), the setting subsection 64 determines the reading conditions for fine scanning. At the same time, using the information about image processing that has been read from the memory means 68, the setting subsection 64 determines what image processing should be done and the order of execution in the same way as in the simultaneous printing. Based on the determined reading conditions and image processing conditions, and optionally using the prescanned data, the setting subsection 64 duplicates the conditions for the image processing that was applied in the simultaneous printing and sets them in the parameter coordinating subsection 72. If associated data such as those about the compositing of letters and images exist, the parameter coordinating subsection 72 accesses the relevant image data file to acquire the necessary data.

The parameter coordinating subsection 72 sets the duplicated image processing conditions (and associated data, if any) in the processing subsection 60 of the fine scanned image processing section 46. This basically finalizes the image processing conditions for re-printing and the fine scanned data is read from the fine scan memory 42, processed in the processing subsection 60 under the finalized conditions, subjected to various conversion processes in the signal processing subsection 62, sent to the driver 80 in the printer 16 and subsequently processed as in the simultaneous printing to output a print P. In the case of re-printing, the prescanned image need not necessarily be presented on the display 20. If, for example, modification or correction of the image or the like is requested by a customer when re-printing is ordered, the image processing conditions may optionally be modified or corrected or verification may be performed in the same manner as in the simultaneous printing.

The image reproduced by re-printing has been obtained by applying the same image processing as in the simultaneous printing under the same image processing conditions and, hence, its color and density feature reasonable agreement with those of the image produced by the simultaneous printing.

As a further advantage, the image processing conditions for re-printing are set on the basis of the information about the image processing for the previous print and, hence, great rapidity is achieved in setting the image processing conditions for re-printing. This is particularly true in the case where LUTs for gray balance adjustment and tonal correction were constructed in simultaneous printing using the image data accumulated for one roll of film F. In the prior art method, re-printing requires the reading of images corresponding to one roll of film F and this is a particularly cumbersome and time-consuming task in the case of a common 135-film which is in a discrete format. This task can be omitted from the present invention to achieve a significant reduction in the overall operating time and cumbersomeness of the operations. Another advantage of the invention that is noteworthy in the case of re-printing is the possibility for omitting the step of extracting the principal part of an image such as the face of a person.

In the cases described above, only the information about image processing is stored in the memory means 68. However, the invention is in no way limited to these cases and not only the information about image processing but also various other information may be stored in the memory means 68 in correspondence with the frame identifying information so that the three kinds of information are used to perform the necessary image processing. This provides for more positive production of a re-print that reproduces an image of the same color and density as the image produced by the simultaneous (previous) printing.

Turning back to the operation of the photoprinter 10, the projected light from the film is converted photoelectrically with the CCD sensor 34 in the scanner 12, whereby the image in each of the frames of the film is read. The quantity of light from the light source 22 and the sensitivity of the CCD sensor 34 are not always the same but variable with time. Therefore, even if the image in the same frame is read with the same apparatus in simultaneous printing and re-printing, the image data outputted from the scanner 12 in re-printing is not necessarily the same as the image data produced in simultaneous printing. As a further problem, the scanner 12 has instrumental (machine-dependent) errors and if different scanners are used to read the image in simultaneous printing and re-printing, the output image data will not necessarily be the same even if the image is in the same frame.

To deal with this situation, the print system of the invention may be so adapted that in addition to the information about the image processing for simultaneous printing, the amounts of image features in the input image data (prescanned data and/or fine scanned data) are also stored in the memory means 68 and the quantities of images features calculated for re-printing are compared with the stored quantities of image features for simultaneous printing and the result of the comparison is referenced to correct the fine scanned data before it is subjected to further image processing.

Specifically, as already mentioned, the setting subsection 64 calculates the quantities of image features from the prescanned image in order to set the image processing conditions and the like. In this embodiment, the quantities of image features calculated in simultaneous printing such as, for example, the average image density, highlight and shadow, the shape of a density histogram (e.g., maximal and minimal densities), as well as the shape of density histogram corresponding to each block that is brought about when an image is divided into blocks, preferably for each of the three primaries R, G and B, are stored in the memory means 68 together with the information about the image processing for the simultaneous printing.

In the case of re-printing, not only the information about image processing but also the quantities of image features calculated in the process of simultaneous printing are read from the memory means 68 and compared with the quantities of image features calculated from the prescanned data for reprinting and the conditions for corrections are set in such a way that the quantities of image features for re-printing agree with those for simultaneous printing. The corrections for which such conditions are set may be exemplified by a shift in the overall image density and correction with a tone correcting curve (LUT).

As already mentioned, if the image processing conditions for re-printing are finalized, the fine scanned data (input image data) is read from the fine scan memory 42 and, prior to processing with the processing subsection 60, corrected under said conditions for corrections: thereafter, the thus corrected fine scanned data is subjected to image processing in the processing subsection 60.

Alternatively, at least one of input image data, reduced image data of the input image data, image data with lowered resolution (on space and/or density) of input image, compressed (encoded) data of the input image data and the like may be stored in the memory means 68, along with the aforementioned information about image processing.

In this embodiment, the thus memorized prescanned data and the like may be used for setting correction conditions that allow the fine scanned data at the simultaneous printing to agree with that at the re-printing, in a same way as in the quantities of image features described above. For example, quantities of image features are calculated from stored image data (or decompressed and decoded image data). Alternatively, fine scan reading for re-printing may not be performed when the fine scanned data is stored in the memory means 68 and, instead, when an order of re-printing and the identifying information of the specific frame are obtained, the fine scanned data at the simultaneous printing and its image processing conditions are read out from the memory means 68 so as to set image processing conditions with which the read fine scanned data may then be processed for finally producing output image data. Alternatively, compressed fine scanned data is decoded, reduced fine scanned data is enlarged, or lowered fine scanned data of its resolution is converted (enhanced) of its resolution so that the restored fine scanned data may be processed in the same manner as in the above-described fine scanned data.

In the case just described above, the quantities of image features prior to image processing are stored in the memory means 68 and only after corrections are made to ensure that the quantities of image features coincide between simultaneous printing and re-printing, the image processing for re-printing is performed. This is not the sole case of the invention and the following alternative approach may be taken: in the process of simultaneous printing, the quantities of image features for the image (image data) processed in the processing subsection 60 are stored in the memory means 68 together with the information about image processing and after calculating the quantities of image features for the image that has been processed in the processing subsection 60 and the image data processed in the processing subsection 60 is subjected to the same corrections as described in the preceding paragraph in such a way that the quantities of image features coincide between simultaneous printing and re-printing.

Alternatively, in a same way as in the aforementioned input image data, image data on its own processed with the processing subsection 50, or 60 (hereinafter called as "output image data"), a reduced image of the output image data, lowered image data of its resolution of the output image data, compressed data of the output image data and the like at the time of the simultaneous printing may be stored in the memory means 68. Production of a re-print using these data may make reference to the aforementioned quantities of image features or the input image data.

According to the embodiments described above, undesired phenomena such as an offset in the image data due, for example, to the status of the scanner 12 are effectively corrected to allow for a more positive production of a re-print that reproduces an image of the same color and density as the image produced by simultaneous printing.

It should, however, be noted that the above-described corrections based on the quantities of image features are not necessary if the instrumental errors from the scanner 12 are within such a narrow range that they can be disregarded between simultaneous printing and re-printing. Alternatively, reading conditions for simultaneous printing are stored so that correction conditions of fine scanned data may be set from the reading conditions of fine scanning set for re-printing in order to correct the instrumental errors from the scanner 12.

Alternatively, in the print system of the invention, if input image data and/or output image data (or their compressed data) is stored, a re-print may be produced using these image data, but without using the film F (or the storing medium of image data, if the print is produced from the digital camera or the like).

A preferred embodiment is exemplified as follows:

In this embodiment, input image data and image processing information on a specific frame, and identifying information of the specific frame may be stored in the memory means 68 in correspondence with each other. Alternatively, the stored input image data may include either only fine scanned data, or fine scanned data together with prescanned data. Moreover, in the printer 16, this identifying information is recorded as a back print.

At the time of the re-printing, the operator enters using the keyboard 18a and the like identifying information recorded on the reverse surface of the print that is ordered to be re-printed. Thus, the processor 14 acquires the identifying information, retrieves or searches the memory means 68, and reads out input image data and information about image processing corresponding to the entered identifying information.

In the same manner as the previous printing (in this case, simultaneous printing) described above, the processor 14 reproduces image processing in case of the simultaneous printing from the obtained information about the image processing. If correction instructions of image (or modified printing) has been issued by the customer, the operator makes a correction on image processing conditions by adjusting a color and density of the image according to these correction instructions. If the prescanned data exists, the image based on the prescanned data may be represented on the display 20, whereas if no prescanned data exists, the image processing conditions may be corrected by thinning out the fine scanned data, displaying an image based on the thinned-out fine scanned data and verifying the displayed image.

After reproducing the image processing conditions or further finishing a correction of the image processing conditions in accordance with a customer's request or verification, and finishing the setting of the image processing conditions to specified sites (that is, establishment of the image processing conditions), the processor 14 processes the read-out fine scanned data that is the input image data by the established image processing conditions to produce image data corresponding to image recording by the printer 16, to which it is then supplied.

The printer 16 produces a re-print using this image data. During the re-printing operation, identifying information may be recorded as a back print.

In the above illustrated cases, information about image processing and input image data have been stored in the memory means 68, whereas, in case of simultaneous printing, only input image data, excluding information about image processing, may be stored.

In this embodiment, image processing conditions in the re-printing are set in a same manner as in the simultaneous printing by using input image data (the prescanned data or the thinned-out fine scanned data) read in accordance with the identifying information so that the set image processing conditions are established after optionally performing modification or correction of the image according to the customer's request or verification and, thereafter, input image data by the fine scanning is processed by the established image processing conditions to produce image data corresponding to image recording by the printer 16, to which it is then outputted in order to produce a re-print.

It should be noted that, in this embodiment, when image processing software is of a different version, or when image correction in simultaneous printing has been performed by the operator, different images may in some cases be produced between re-printing and simultaneous printing.

As another preferred embodiment, output image data may be stored.

In other words, output image data and identifying information of the specific frame in simultaneous printing are stored in the memory means 68 in correspondence with each other. In this case, only the output image data by the fine scanned data may basically be stored. In a same manner as is described above, the printer 16 records identifying information as a back print.

At the re-printing, the operator enters identifying information using the keyboard 18a looking at the reverse surface of the print. Thus, the processor 14 acquires the identifying information, retrieves or searches the memory means 68, and reads out output image data corresponding to the entered identifying information.

The processor 14 processes the read-out output image data with the signal processing subsection 62 to produce image data corresponding to image recording by the printer 16, to which it is then outputted. If modification or correction of the image is instructed by the customer, the operator corrects the image processing conditions in accordance with the customer's instructions of the modification or correction in the same manner as described above. Moreover, the fine scanned data is optionally thinned out so that the image based on it is displayed on the display 20 and verified. Alternatively, if the prescanned data exists, verification may be performed by using this image data.

The printer 16 produces a re-print using the thus obtained image data, where identifying information may be recorded as a back print.

In the above exemplary illustrated cases, identifying information is recorded in the back print of the print so that, when re-printing is performed, identifying information is inputted using this back print to permit the processor 14 to acquire it.

In this embodiment, items recorded in an index print may be utilized as identifying information; hence, instructions for re-printing and identifying information may also be inputted using the index print instead of the print.

Besides the print and the index print, identifying information of the print for re-printing may be noticed by the customer orally or by means of a memo so that inputting operation may be performed with the keyboard 18a and the like.

As is apparent from the above description, the above exemplary illustrated cases are also preferably applicable for re-printing of prints using various non-film F image data supply sources that include an image reading apparatus which reads the image on a reflection original, imaging devices such as a digital camera, a digital video camera and the like, communication means such as a LAN (local area network) and the like and recording media such as a memory card, an MO (magneto-optical disc) and the like.

Meanwhile, further referring to the photoprinter 10, the light-sensitive material A in the printer 16 is exposed to optical beams modulated with the image data outputted from the image processor 14 and the exposed light-sensitive material A is subjected to development and specified subsequent processing, whereupon it emerges as a print P. Therefore, even if the image processor 14 outputs the same image data, the output image will have a varying color/density if the output power and wavelength of the optical beams produced in the printer 16, the temperatures for development and subsequent processing, the concentrations of processing solutions and so forth vary. As a matter of fact, these conditions are variable with time or even within a day and, as a result, even if the same image data is outputted from the processor 14 in simultaneous printing and re-printing, the image in the output prints P may occasionally have a varying color/density.

To deal with this situation, the print system of the invention may be so adapted that the instrumental errors from the printer 16 are corrected using the quantities of image features for the image reproduced by simultaneous printing.

To be more specific, when outputting an image produced by simultaneous printing, the density of the image is measured and, as in the aforementioned case, the quantities of image features for that image are calculated and stored in the memory means 68 together with the aforementioned information about image processing.

In the process of re-printing, the quantities of image features for the simultaneous printing are read from the memory means 68 and, at the same time, the image of the print to be outputted from the printer 16 is predicted on the basis of the output image data that is produced from the image processor 14 during re-printing (said data may be replaced by the image data processed in the signal processing subsection 62 or the image data processed in the processing subsection 60) and the quantities of image features for that image (which are hereinafter referred to as "predicted quantities of image features") are calculated. Subsequently, the two sets of quantities of image features are compared and the conditions for corrections are set in such a way that the predicted quantities of image features coincide with the quantities of image features for simultaneous printing and the output image data is processed under the thus set correction conditions and thereafter outputted to the driver 80 in the printer 16.

Alternatively, measured image data of the print, its compressed data, reduced image data and resolution lowering data may be stored and thereafter utilized in a same way as in the fine scanned data mentioned above.

Thus, according to the embodiment just described above, a re-print reproducing an image of the same color and density as the image produced by simultaneous printing can be produced more positively irrespective of the status of the printer 16.

It should be noted here that the above-described corrections based on the quantities of image features are not necessary if the instrumental errors from the printer 16 are within such a narrow range that they can be disregarded between simultaneous printing and re-printing. Alternatively, the status of the printer 16 during the simultaneous printing is stored so that correction conditions to correct the instrumental errors of the printer 16 may be set based on that status.

As in the embodiment, the method of correction for bringing the predicted quantities of image features into agreement with the quantities of image features for simultaneous printing may be exemplified by shifting of the overall image density and correction with a tone correcting curve.

With a common printer, the relationship between supplied image data and the density of the print image can reasonably be identified as the output characteristic of the printer. Hence, the image in the print P to be outputted from the printer 16 may be predicted from the output image data with the aid of this relationship. For details of this embodiment, reference may be had to the specification of commonly assigned Japanese Patent Application No. 238176/1996.

In the cases described above, the image processing applied, the image processing conditions and so forth are stored as the information about image processing and re-printing is done by using the stored information to duplicate the image processing applied in the simultaneous printing. In the present invention, various other data may be used as the information about image processing, thereby outputting a re-print that reproduces the same image as obtained by simultaneous printing. In an exemplary case, the difference between the input and output image data obtained in simultaneous printing is stored in the memory means 68 as the information about image processing, preferably in a compressed format; in the process of re-printing, the difference is retrieved from the memory means 68, read with the scanner 12 and added to the image data processed in the data processing section 54 and the sum is delivered as output image data to the printer 16.

When the image on the film F is read with the scanner 12, the reading area of the film is defined by a mask formed on the carrier or the like. Needless to say, the size of the mask is smaller than that of the image in each of the frames of the film and, therefore, if the image position relative to the mask is offset between simultaneous printing and re-printing, different images will be reproduced. This also occurs when trimming is done by selecting a portion of the image and reproducing it at an increased scale; if the image position relative to the mask is offset between simultaneous printing and re-printing, different images will be reproduced.

To deal with this situation, the print system of the invention may be so adapted as to be capable of correcting the positional offset in the input image data between simultaneous printing and re-printing; to this end, not only the information about image processing but also positional reference data is recorded and used for re-printing (see the specification of Japanese Patent Application No. 69366/1997).

In the cases described above, prescanned data is used to extract the region of the principal part of the image, set the image processing conditions and perform other steps. The present invention is in no way limited to these cases and the steps exemplified above may be performed using fine scanned data. It should, however, be noted that steps such as the extraction of the principal part of the image and the setting of the image processing conditions need not be performed with image data of high pixel density. In addition, the calculation time increases with the number of pixels. Therefore, in consideration of various factors, especially the operating efficiency, the steps mentioned above are preferably performed using prescanned data.

It should also be noted that in the foregoing cases, prescanning is performed and the prescanned data is used to set the image processing conditions and perform other steps. However, the present invention is not limited to these cases and the scanner 12 may be designed to perform only fine scanning such that the fine scanned data is partly eliminated to prepare image data of a lower pixel density like the prescanned data, which is employed in extracting the principal part of the image, setting the image processing conditions and performing other steps.

As already noted, the applicability of the print system of the invention is not limited to the case of outputting prints reproducing the image recorded on the film F. It may be so adapted that image data is received from various image data supply sources including imaging devices such as a digital camera and a digital video camera and recording media such as a floppy disk and a photo CD and that prints reproducing the image of interest are outputted. The concept of the invention is also applicable to this method of print production and re-prints can be outputted that reproduce an image of the same color and density as the image produced by simultaneous printing.

In this case, too, the information about image processing is the same as the image output from the film F and the frame identifying information can be processed by the various methods exemplified in connection with the use of the film F. If desired, device-generated signals may be used as the frame identifying information.

The print reproducing the image as supplied from various image data supply sources is returned to the customer and, in this case, the processed image data may also be returned. Preferably, the image data supplied from the customer is returned unprocessed (in its original state) because of the following advantages:

depending on what image processing was executed (e.g., blurring or compositing of letters and images), the processed image data cannot be restored to its original state, so in order to ensure that later requests of customers for changing the contents of image processing, re-printing is preferably executed as a duplication of the image processing (inclusive of later changes) of the original image;

secondly, the results of compositing images having copyright such as animation characters and TV personalities may be problematic if they are distributed as image data, so they are preferably restricted to prints.

The print system of the invention is applicable with advantage not only to the digital photoprinter shown in FIG. 1 but also to the conventional direct-exposing (analog exposure) photoprinter. As is well known, the operating principle of the direct-exposing photoprinter is such that projected light carrying the image recorded on a film is focused on a light-sensitive material, which is exposed to the projected light to form a latent image, which in turn is rendered visible by development and subsequent specified processing to produce a print reproducing the image recorded on the film. In order to ensure that the appropriate image is reproduced on the print, the light-sensitive material is exposed to the projected light through the film, with the respective color filters of C (cyan), M (magenta) and Y (yellow) being inserted by suitable amounts into the optical path for adjusting the colors of the image and with the opening of the diaphragm being adjusted to control the quantity of the projected light, thereby adjusting the density of the image. To determine the amounts by which the respective color filters are inserted into the optical path and the amount of adjustment of the diaphragms opening, the image recorded on the film may be read photoelectrically to obtain image data (input image data) and the quantities of image features such as the LATD, highlight and shadow of the image are calculated for use as the basis for the determination.

When using the print system of the invention in a direct-exposing photoprinter, the amounts by which the respective color filters were inserted into the optical path in simultaneous printing and the amount of adjustment of the diaphragm's opening are stored in the memory means as information about image processing and in the process of re-printing, the stored information about image processing is retrieved in accordance with the frame identifying information that was received in the same manner as described in the foregoing cases and the same exposing conditions as employed in the simultaneous printing are duplicated and used to perform exposure with the projected light for producing a re-print.

Alternatively, in a same manner as in the aforementioned digital photoprinter, input image data (itself, reduced image, compressed data and resolution lowering data), photometry data of the produced print (itself, reduced image, compressed data and resolution lowering data) and the like are stored and may thereafter be utilized for the re-printing While the print system of the present invention has been described above in detail, it should be noted that the invention is by no means limited to the embodiments described above and that various improvements and modifications can be made without departing from the scope and spirit of the invention.

As described in detail on the foregoing pages, the print system of the invention enables the production of re-prints that feature consistent reproduction of an image having the same color and density as the image reproduced by simultaneous printing and, hence, re-prints that fully meet a customer's request can be outputted in a satisfactory manner.

What is claimed is:

1. A print system for image processing and print reproduction, comprising:

acquisition means for acquiring identifying information that identifies each of a plurality of frames of film on which an image is recorded;

memory means for storing said acquired identifying information, and for storing image processing information used for producing original prints and re-prints from recorded images of each of said plurality of frames, wherein said acquired identifying and image processing information of each frame is stored in corresponding relation to one another within said memory means; and condition setting means for setting image processing conditions based on said recorded image when producing an original print, and for retrieving, based on said acquired identifying information previously stored in said memory and used for producing said original print, image processing information corresponding to said acquired identifying information when producing a re-print, said condition setting means setting image processing conditions based on said retrieved image processing information, said set image processing conditions identical to those used for producing said original print.

2. The print system according to claim 1, wherein said image processing information is at least one member of the group consisting of kinds of image processing jobs performed commonly over entire lots, kinds of image processing jobs performed on each frame, order of the image processing jobs performed, image processing conditions and data related to the image processing, and wherein said image processing conditions are at least one member of the group consisting of parameters used for each image processing job, applicable ranges of the image processing jobs, reference sites for the related data and control parameters related to hardware control in the print system.

3. The print system according to claim 1,
wherein said memory means further stores at least one member of the group consisting of a plurality of image features for input image data produced in the previous printing, the input image data of the previous printing, reduced image data for the input image data produced in the previous printing, resolution conversion image data for the input image data produced in the previous printing compressed image data for the input image data produced in the previous printing, a plurality of image features for the output image data produced in the previous printing, the output image data produced in the previous printing, reduced image data for the output image data produced in the previous printing, resolution conversion image data for the output image data produced in the previous printing, compressed image data for the output image data produced in the previous printing, and wherein
said condition setting means sets image processing conditions for re-printing so that any differences between image data used in the re-printing as compared to image data used in the previous printing are minimized.

4. The print system according to claim 1, wherein said identifying information further includes film information that identifies the film and frame number, and wherein said acquisition means acquires said identifying information from at least one element of the group consisting of a recording medium formed on the film, a description on the film, a label attached to the film, a description on a container of the film, a label attached to the container of the film, an optical record on the film, a bar code recorded on the film, a DX code, an extended DX code, information on the date when the first print was made, customer's information which is in the possession of a photofinisher, and data on prints which have been processed by a photofinisher.

5. The print system according to claim 1, which further includes means for constructing film information for identifying said film, and means for imparting said film information to said film and to a container of said film.

6. The print system according to claim 1, wherein said memory means is at least one member of a group consisting of a recording medium on the film, a recording medium located within or outside the print system, and a database in the possession of a photofinisher.

7. The print system according to claim 1, wherein image data is supplied not from the film but from an image data supply source, and a print is outputted to re-produce an image carried by said image data.

8. The print system according to claim 1, wherein digital image data is outputted in lieu of or in addition to a print during said previous printing, and wherein said digital image data, information identifying said digital image data and image processing information are received during said re-printing, thereby out-putting a print re-production of said digital image data.

9. The print system according to claim 1, wherein the print system is a digital print system which photo-electrically reads said recorded image on film, processes resultant input image data to produce output image data, exposes a light-sensitive material to recording light modulated based on said output image data, and produces a finished print.

10. The print system according to claim 1, wherein the print system is an analog print system which photo-electrically reads said recorded image on film, optically processes projected light through said film based on resultant input image data, and exposes a light-sensitive material to said projected light to produce a finished print.

11. A print system for image processing of optically recorded image data and print reproduction, comprising:
acquisition means for acquiring identifying information that identifies an image of an outputted print;
memory means for storing said acquired identifying information, and for storing image data used for producing said out-putted prints,
wherein said acquired identifying information and image data are stored in corresponding relation to one another within said memory means; and
image processing means for setting image processing conditions based on said image, performs image processing of said image data based on said set image processing conditions and outputs said processed image data when producing an original print, and for retrieving, based on said acquired identifying information previously stored in said memory and used for producing said original print, image processing data corresponding to said acquired identifying information, performs processing on said retrieved image data and outputs said processed retrieved image data when producing a re-print, wherein image processing conditions for said re-print are identical to those used for producing said original print.

12. The print system according to claim 11, wherein said memory means stores said processed image data, unprocessed image data, or the unprocessed image data and information about image processing applied to said unprocessed image data.

13. The print system according to claim 12, wherein, when said memory means stores the unprocessed image data and the information about image processing applied to said unprocessed image data, said image processing means reproduces, when producing the re-print, image processing set in previous printing employing said information about image processing.

14. The print system according to claim 11, wherein, when the print is produced, said identifying information is recorded on at least one of the print and an index print outputted together with the print.

15. A print system for image processing of an image recorded on film or of image data supplied from an image supply source and for print reproduction, comprising:
acquisition means for acquiring identifying information that identifies each frame corresponding to said recorded image;
memory means for storing said acquired identifying information, and for storing image processing information used for producing an original print of said frame, wherein said acquired identifying information and image processing information are stored in corresponding relation to one another within said memory means; and image processing means for setting image processing conditions based on said recorded image or image data when producing an original print, and for retrieving, based on said acquired identifying information previously stored in said memory and used for producing said original print, image processing data corresponding to said acquired identifying information when producing a re-print, wherein image processing conditions for said re-print are identical to those used for producing said original print.

16. The print system according to claim 15, wherein digital image data is outputted in lieu of or in addition to a print during said original printing, said condition setting means retrieves said digital image data, information identifying said digital image data and image processing information during said re-printing, thereby outputting a print reproducing said digital image data.

17. A printing apparatus, comprising:

an image reading unit for reading images recorded on a plurality of frames of film, said reading performed on a frame-by-frame basis; and a processor for processing said read images of each of said plurality of frames, including:

an acquisition unit for acquiring identifying information of each of said plurality of frames;

a memory for storing said acquired identifying information, and for storing image processing information corresponding to each of said plurality of frames, said acquired identifying information stored together with said image processing information in corresponding relation to each of said plurality of frames; and a coordinating unit for setting image processing conditions within said processor, wherein said coordinating unit supplies said memory with said acquired identifying and image processing information of a frame for an original printing of said frame; and wherein said coordinating unit retrieves image processing information of said frame from said memory for a re-printing of said frame, said retrieved image processing information based on the acquired identifying information of said frame information previously stored together with said image processing information.

18. The printing apparatus as defined in claim 17, wherein the processor further includes a key correcting unit for calculating adjustments to said image processing conditions, said key correcting unit sending the calculated adjustments to said coordinating unit.

19. The printing apparatus as defined in claim 18, further including a manipulating unit for entering various conditions and adjustments to said key correcting unit acquisition units.

20. The printing apparatus as defined in claim 17, wherein said film includes film identifying information which is automatically determined by said processor and which is sent to said acquisition unit.

21. The printing apparatus as defined in claim 17, wherein said processor optionally extracts a principal part of an image on said frame so that if an original printing of a frame was limited to said principal part, image processing information about said principal part is stored in said memory for subsequent re-printing of said frame.

22. The printing apparatus as defined in claim 17, said memory further storing image features selected from at least one of input image data, output image data and an original print of each of said plurality of frames, wherein image features calculated for re-printing are compared with stored image features of said original printing to correct deficiencies in said re-print image features resulting from variable conditions within said image reading unit, prior to further image processing within said processor.

23. The printing apparatus as defined in claim 17, said memory further storing image features selected from at least one of input image data, output image data and an original print of each of said plurality of frames, wherein image features calculated for re-printing are compared with stored image features of said original printing to correct deficiencies in said re-print image features resulting from variable conditions within a printer connected to the apparatus, prior to sending image processing information for re-printing to said printer.

24. A method of determining image processing conditions for image processing and print reproduction, comprising:

determining processing conditions used for producing a desired original print of images read from a plurality of frames of film; said processing conditions determined from identifying and image processing information corresponding to each of said plurality of frames;

storing said identifying and image processing information in memory;

supplying said memory with said identifying and image processing information for producing an original print from at least one of said plurality of frames; and retrieving identical image processing information used for producing the original print of said frame from said memory for producing a re-print of said frame, said retrieved image processing information based on the identifying information of said frame used for determining said processing conditions for said original print.

* * * * *